C. H. FELTON.
DUST SEPARATOR.
APPLICATION FILED AUG. 11, 1919.
1,390,284.
Patented Sept. 13, 1921.
2 SHEETS—SHEET 1.
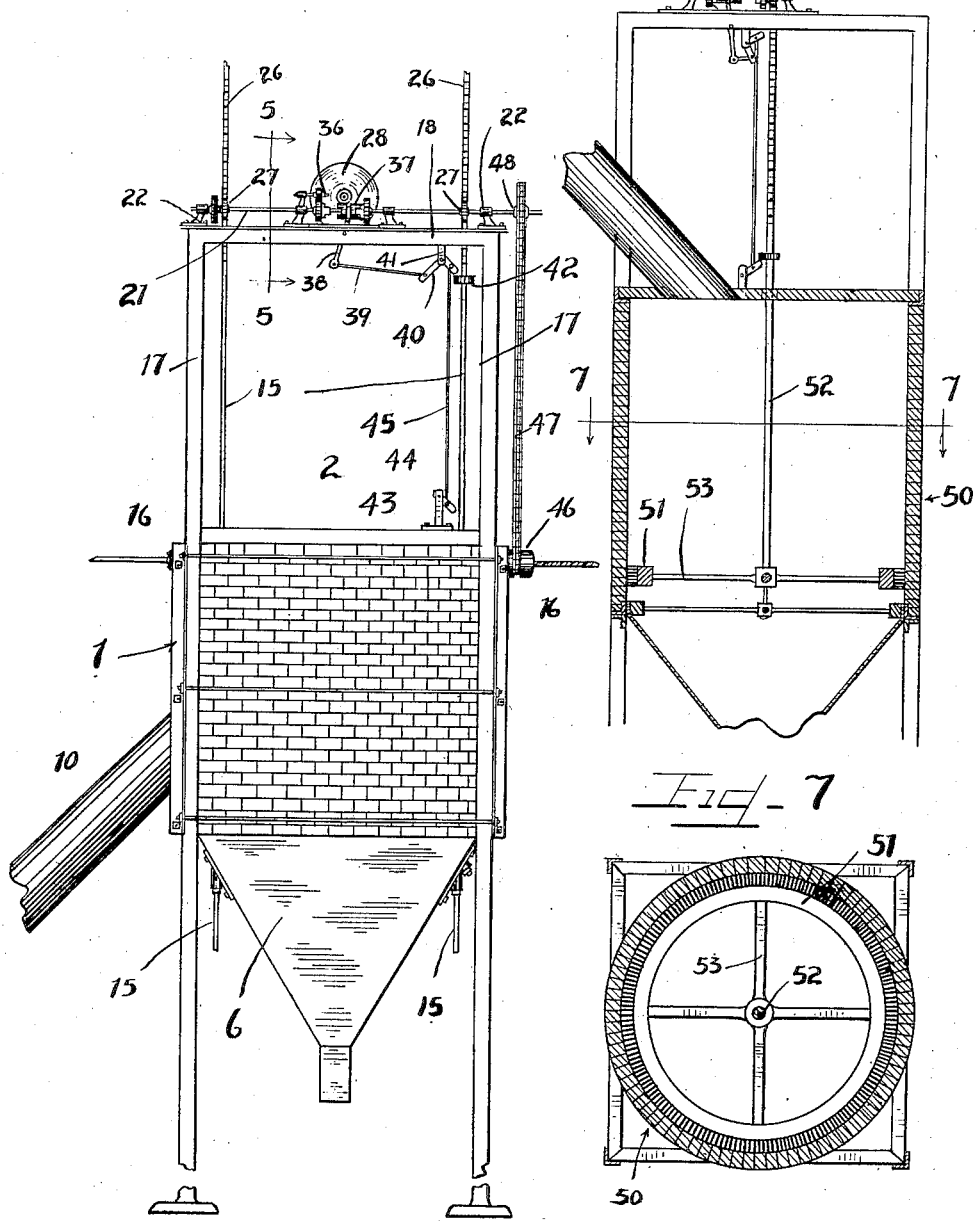
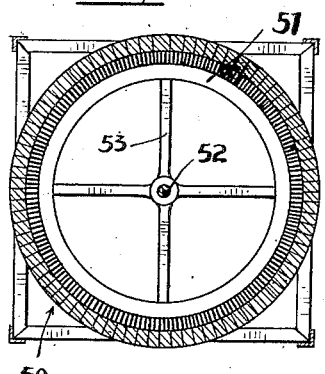

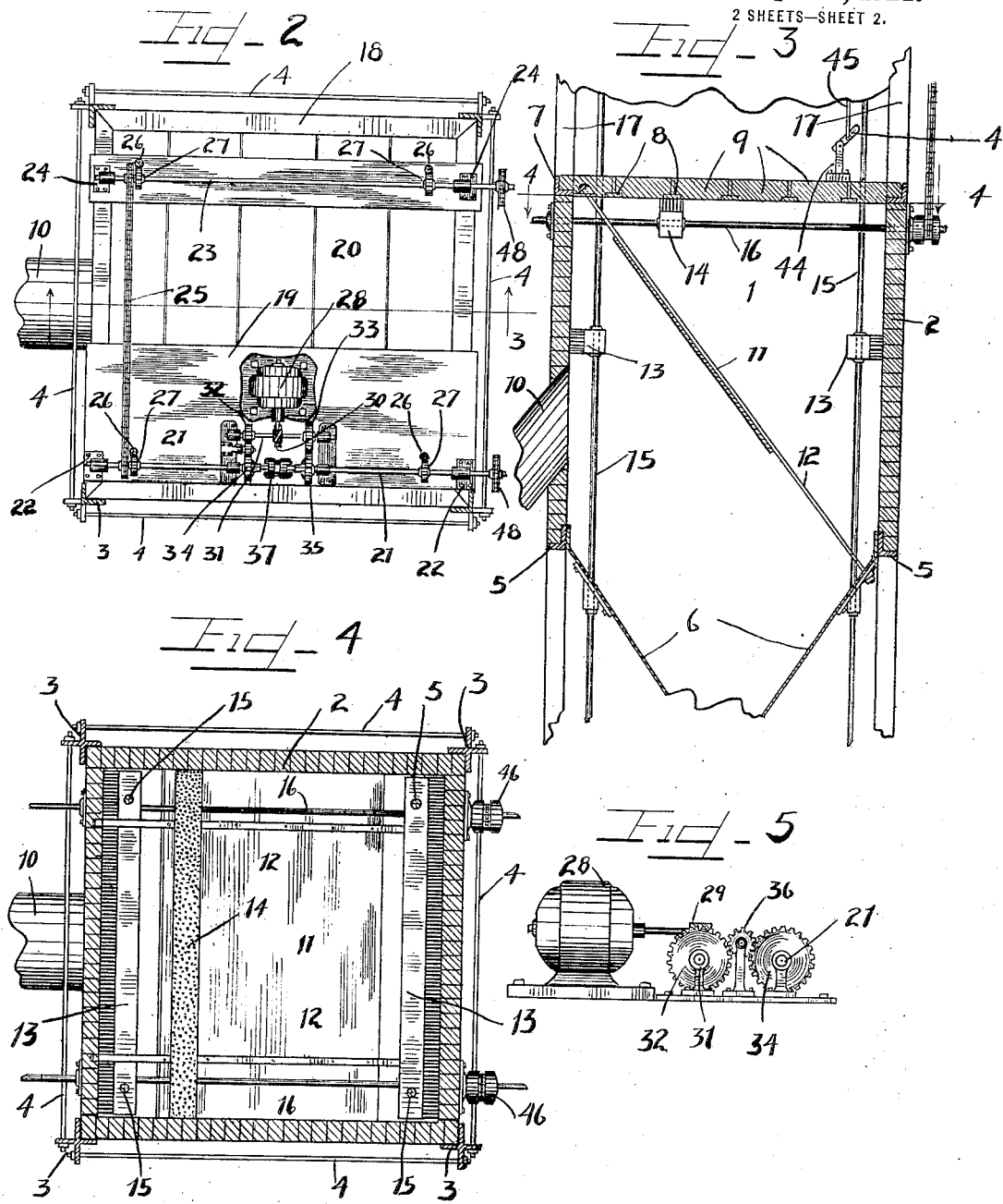

UNITED STATES PATENT OFFICE.

CHARLES H. FELTON, OF MICHIGAN CITY, INDIANA.

DUST-SEPARATOR.

1,390,284.　　　　　Specification of Letters Patent.　　Patented Sept. 13, 1921.

Application filed August 11, 1919.　Serial No. 316,700.

*To all whom it may concern:*

Be it known that I, CHARLES H. FELTON, a citizen of the United States, and a resident of Michigan City, in the county of Laporte and State of Indiana, have invented certain new and useful Improvements in a Dust-Separator; and I do hereby declare that the following is a full, clear, and exact description of the same, reference being had to the accompanying drawings, and to the numerals of reference marked thereon, which form a part of this specification.

This invention relates to dust separators for collecting cement dust, ore particles, soot or the like from furnace or other gases and may be used wherever there is loss of material from dust or smoke stacks.

Where dust laden gases have been passed through porous mediums to separate the dust the pores of the medium have become clogged by the accumulation of the dust.

It is an object, therefore, of this invention to provide means for keeping the porous filtering medium free from adhering dust.

A further object of the invention is to provide means for continuously moving a brush over the inner surface of the porous filtering medium to remove dust therefrom.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of a dust separator embodying the features of the present invention.

Fig. 2 is a plan view of the same.

Fig. 3 is a section on the line 3—3 of Fig. 2.

Fig. 4 is a section on the line 4—4 of Fig. 3.

Fig. 5 is a view taken on the line 5—5 of Fig. 1 with parts removed.

Fig. 6 is a side elevation, partly in section, of a modified form of construction.

Fig. 7 is a section on the line 7—7 of Fig. 6.

As shown on the drawings:

The separator comprises a rectangular chamber 1, having four walls 2, of porous brick. Preferably these walls are about four inches thick and made of hand made porous sandy clay brick or else cement blocks from a mixture of eight parts of sand to one part of cement. The walls 2, are held together by angle bars 3, embracing each outer corner and braced together by tie-rods 4. Each wall is supported by an angle bar 5, to which is clamped the upper margin of a conical hopper 6.

Around the upper edges of the walls 2, is arranged a frame 7, composed of angle bars between which extend a series of T-bars 8, for supporting rows of porous bricks 9.

The dust laden gases are introduced into the chamber 1, by a flue 10, extending through one of the walls. Diagonally arranged within the chamber 1, is a deflector 11, against which the gases entering by the flue 10, impinge. Some of the heavier particles are checked by this deflector and drop therefrom into the hopper 6. The lighter particles pass with the gases underneath the deflector and are finally caught by the porous brick walls of the chamber. Rods 12 are provided, secured to the frame 7, and hopper 6, respectively, for supporting the deflector.

The inner surfaces of the brick walls of the chamber are kept clean by a brush 14, arranged to contact with the brushes 13, 13 contacting with the side where the flue 10 enters and with the opposite side top of the chamber respectively. The two other walls because they are parallel to the principal movement of the gases do not receive so great a deposit of dust. Also if they become clogged it will interfere much less with the flow of the gases than if the other walls were clogged. For these reasons it is not necessary to provide machinery for continually cleaning these walls. The brushes 13, are mounted on rods 15, having sliding engagement with the top of the chamber and the hopper so that by raising and lowering the rods each brush may be moved from top to bottom of the wall in which it is in contact. Similarly the brush 14, is mounted on a pair of rods 16, slidable transversely through the walls of the chamber for moving the brush to and fro across the top of the chamber.

These rods are operated by mechanism now to be described. On upward extensions 17, of the angle members 3, is arranged a frame 18, carrying two platforms 19 and 20. A shaft 21, journaled in bearings 22, is mounted on the platform 19, and a similar shaft 23, is journaled in bearings 24, on the platform 20. These shafts are connected by a chain 25, passing around sprockets on each shaft so that by rotating the latter all four rods 15, may be raised and lowered simultaneously.

For rotating the shaft 21, an electric motor 28, is provided. On the shaft of this motor is mounted a worm 29, in mesh with a worm wheel 30, mounted on a shaft 31. Gears 32 and 33, are non-rotatably secured to this shaft 31, for driving loose gears 34 and 35, on the shaft 21. The gears 33 and 35, mesh directly with each other while the gears 32 and 34, are connected by an idle pinion 36. Consequently, the gears 34 and 35, rotate in opposite directions. Clutch teeth are formed on adjacent faces of these gears for alternate engagement with a clutch 37, slidably but non-rotatably mounted on the shaft 21, so that the latter may be driven at will in either direction.

The clutch is operated by a rocker 38, pivotally mounted on the frame. This rocker is connected by a link 39, with one arm of a bell-crank 40, pivotally mounted on a bracket 41. The other arm of this bell-crank is adapted to be engaged by a projection 42, on one of the rods 15, as the latter are raised by the action of the gears 27, on the racks 26. Such engagement causes the clutch to be shifted to reverse the direction of rotation of the shafts 21 and 23. In order that the clutch may be shifted at the other end of the travel of the brushes 13, a lever 43, is provided pivotally mounted on a bracket 44, and connected by a link 45, to the bell-crank.

The brush 14, is reciprocated simultaneously from the same shafts 21 and 23. For this purpose a very high pitched thread is formed on each of the rods 16, for engagement with a nut 46. Sprocket teeth are formed on each of the nuts 46, so that the latter may be rotated by chains 47, passing around sprockets 48 on the shafts 21 and 23.

In Figs. 6 and 7 a modified form of construction is shown in which the chamber 50, is circular in form so that its entire side wall may be swept by an annular brush 51. For operating the brush a single central rod 52, is provided, connected to the brush by means of a spider 53. The method of reciprocating the rod 52 is exactly analogous to that illustrated and described in connection with Figs. 1 to 5, so need not be described again.

I am aware that numerous details of construction may be varied through a wide range without departing from the principles of this invention, and I therefore do not purpose limiting the patent granted otherwise than necessitated by the prior art.

I claim as my invention:

1. A dust collector comprising a rectangular chamber having a porous wall, a frame within the chamber, a brush secured to the frame adapted to remove dust adhering to the surface of the wall, a pair of rack bars connected to the two ends of the frame, a pair of pinions engaging the rack bars for reciprocating the frame and a shaft on which both of said pinions are mounted.

2. A dust collector comprising a chamber having a porous wall, a brush within the chamber adapted to remove dust from one of the walls thereof, a plurality of rack bars secured to the brush and extending through one of the walls of the chamber, a plurality of pinions engaging the rack bars for reciprocating the brush and a shaft on which all of said pinions are mounted.

3. A rectangular chamber having roof and side walls of porous material, brushes in contact with the interior faces of certain of the side walls, and a brush in contact with the under side of the roof, and means for rectilinearly reciprocating said brushes.

4. A rectangular chamber, a flue entering one side of said chamber, porous walls constituting the top, the side where the flue enters and the opposite side of said chamber, a baffle between said two sides, brushes in contact with the inner faces of said top and sides, and means for moving said brushes over the surfaces with which they contact.

5. In a filter, a rectangular chamber having porous roof and walls, vertically reciprocating brushes for cleaning the inner surfaces of said walls, and a horizontal reciprocating brush for cleaning the inner surface of said roof, a set of connections for moving said side wall brushes extending through the roof, a set of connections for moving said roof brush extending through the side walls, a common source of motive power and power transmitting devices for operating both sets of said connections, one of said sets including a rack and pinion movement and the other set including a nut and screw movement.

In testimony whereof I have hereunto subscribed my name in the presence of two subscribing witnesses.

CHARLES H. FELTON.

Witnesses:
J. J. WATSON,
ALLEN J. SNOOK.